(12) United States Patent
Schoenbauer et al.

(10) Patent No.: US 11,693,397 B2
(45) Date of Patent: Jul. 4, 2023

(54) METHOD AND CONVEYING APPARATUS FOR THE IMPROVED DETERMINATION OF THE POSITION OF AN OBJECT TRANSPORTED ON THE CONVEYING APPARATUS

(71) Applicant: TGW Mechanics GmbH, Wels (AT)

(72) Inventors: Manuel Schoenbauer, Taufkirchen an der Trattnach (AT); Florian Georg Karer, Linz (AT); Richard Grimminger, Scharten (AT); Simon Kaltseis, Haibach ob der Donau (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 230 days.

(21) Appl. No.: 17/423,361

(22) PCT Filed: Mar. 27, 2020

(86) PCT No.: PCT/AT2020/060132
§ 371 (c)(1),
(2) Date: Jul. 15, 2021

(87) PCT Pub. No.: WO2020/198772
PCT Pub. Date: Oct. 8, 2020

(65) Prior Publication Data
US 2022/0128978 A1 Apr. 28, 2022

(30) Foreign Application Priority Data
Mar. 29, 2019 (AT) .............................. A 50275/2019

(51) Int. Cl.
*G05B 19/418* (2006.01)
*B65G 43/08* (2006.01)

(52) U.S. Cl.
CPC ......... *G05B 19/4189* (2013.01); *B65G 43/08* (2013.01); *B65G 2203/0233* (2013.01);
(Continued)

(58) Field of Classification Search
CPC ...... G05B 19/4189; G05B 2219/45054; B65G 43/08; B65G 2203/044
(Continued)

(56) References Cited

U.S. PATENT DOCUMENTS 5,070,995 A * 12/1991 Schaffer ................. B65G 43/10
198/460.1
7,681,712 B2 * 3/2010 Hara ...................... B65G 47/31
198/577
(Continued)

FOREIGN PATENT DOCUMENTS

EP 3 282 220 A1 2/2018
FR 2 639 442 A1 5/1990
(Continued)

OTHER PUBLICATIONS

JP S6250365 (Year: 1987).*
International Search Report in PCT/AT2020/060132, dated Jul. 23, 20220.

*Primary Examiner* — Gene O Crawford
*Assistant Examiner* — Lester Rushin, III
(74) *Attorney, Agent, or Firm* — Collard & Roe, P.C.

(57) ABSTRACT

The invention relates to a method for the position determination of an object (6, 6a . . . 6d), which is conveyed on a conveying device (1a . . . 1c). In this process, a deviation (ΔP) between a position ($P_{sig}$) of the object (6, 6a . . . 6d), which is calculated with the aid of rotation signals from the drives (M) for conveyor elements (2, $2_M$, $2_L$) of the conveying device (1a . . . 1c), and a position ($P_1 . . . P_5$) of a detection area ($E_1, E_2$) of a sensor ($L_1 . . . L_5$) fixedly installed on the conveying device (6, 6a . . . 6d) is deter-
(Continued)

Figure 1:
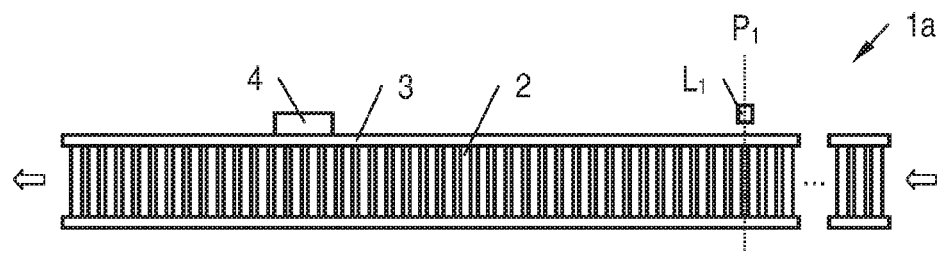

mined and used for calculating a corrected position ($P_{korr}$) of the object (6, 6a ... 6d) during a movement of the object (6, 6a ... 6d) away from this detection area ($E_1, E_2$). Furthermore, a conveying device (1a ... 1c) for performing the presented method is indicated.

15 Claims, 6 Drawing Sheets

(52) U.S. Cl.
CPC .............. *B65G 2203/044* (2013.01); *G05B 2219/45054* (2013.01)

(58) Field of Classification Search
USPC ...................................... 198/502.3
See application file for complete search history.

(56) References Cited

U.S. PATENT DOCUMENTS

| | | |
|---|---|---|
| 2014/0277698 A1 | 9/2014 | Combs et al. |
| 2017/0277698 A1* | 9/2017 | Heard .................. G06F 16/137 |

FOREIGN PATENT DOCUMENTS

| | | |
|---|---|---|
| JP | 2004-115152 A | 4/2004 |
| WO | 2011/038439 A1 | 4/2011 |
| WO | 2011/038441 A1 | 4/2011 |

* cited by examiner

METHOD AND CONVEYING APPARATUS FOR THE IMPROVED DETERMINATION OF THE POSITION OF AN OBJECT TRANSPORTED ON THE CONVEYING APPARATUS

CROSS REFERENCE TO RELATED APPLICATIONS

This application is the National Stage of PCT/AT2020/060132 filed on Mar. 27, 2020, which claims priority under 35 U.S.C. § 119 of Austrian Application No. A50275/2019 filed on Mar. 29, 2019, the disclosure of which is incorporated by reference. The international application under PCT article 21(2) was not published in English.

The invention relates to a method for the position determination of an object, which is conveyed on a conveying device by means of conveyor elements, and comprises the steps:

a) setting a positional value, which is assigned to the object in a controller of the conveying device, to the position of a first detection area of a first sensor fixedly installed on the conveying device, when the object is detected in the first detection area;

b) calculating a position of the object with the aid of rotation signals from drives for the conveyor elements of the conveying device, starting from the position of the first detection area during a movement of the object away from the first detection area, and c) setting the positional value, which is assigned to the object in the controller of the conveying device, to the position of a second detection area of the first sensor or of a second sensor fixedly installed on the conveying device, when the object is detected in the second detection area.

The invention further relates to a conveying device with a controller for the position determination of an object conveyed on the conveying device by means of conveyor elements, wherein the controller is configured to:

a) set a positional value, which is assigned to the object in the controller of the conveying device, to the position of a first detection area of a first sensor fixedly installed on the conveying device, when the object is detected in the first detection area;

b) calculate a position of the object with the aid of rotation signals from drives for the conveyor elements of the conveying device, starting from the position of the first detection area during a movement of the object away from the first detection area, and c) set the positional value, which is assigned to the object in the controller of the conveying device, to the position of a second detection area of the first sensor or of a second sensor fixedly installed on the conveying device, when the object is detected in the second detection area.

Such a method and such a conveying device are in general known from the prior art. For example, the position of the object can generally be calculated there with the aid of rotation signals from drives for conveyor elements of the conveying device, for instance with the aid of a rotary encoder or a Hall sensor of a drive motor of the conveyor roller and the circumference of the conveyor roller (step b). Unforeseen events, such as slipping of conveyor rollers, a collision of two objects and so on, may lead to the calculated position sometimes deviating greatly from the real position. Therefore, the positional value of the object is (re)set in the controller of the conveying device to known positions of sensors, which are fixedly installed along the conveying device (steps a and c).

However, more current research has shown that not only unforeseen events lead to a deviation of the calculated position from the real position but that there are also systematic deviations, which always occur, even if they are usually significantly smaller than the deviations caused by the unforeseen events. Continually increasing requirements for the positioning accuracy on conveying devices of merchandise trade, however, lead to even these small deviations having a disruptive effect on the processes happening on a conveying device, in particular in a storage and order-picking system.

Therefore, one object is to improve the position determination of an object transported on the conveying device. In particular, systematically occurring deviations are also to be considered.

The object of the invention is achieved by a method of the initially mentioned type, which additionally comprises the following steps:

d) determining a deviation between the position calculated by means of the rotation signals from the drives and the position of the second detection area after the object has been detected in the second detection area, and e) using the determined deviation for calculating a corrected position of the object with the aid of the rotation signals from the drives during a movement of the object away from the second detection area.

The object of the invention is also achieved by a conveying device of the initially mentioned type, in which the controller is additionally configured to d) determine a deviation between the position calculated by means of the rotation signals from the drives and the position of the second detection area after the object has been detected in the second detection area, and e) use the determined deviation for calculating a corrected position of the object with the aid of the rotation signals from the drives during a movement of the object away from the second detection area.

By the suggested measures, the corrected position calculated by means of the rotation signals from the drives corresponds more closely to the real or actual position of the object on the conveying device.

In general, the described method can be carried out without an explicit specification of a target position for an object, however, in particular, the method is also suitable in the context of a position control for the objects. In this case, the controller specifies a target position for the object, the adherence to which is checked with the aid of the corrected position. In this regard, the conveyor elements and/or their drives form the adjustment members of the control loop and can simultaneously be a part of the position measuring system, and the controller assumes or comprises the function of the (position) control (closed loop control). Other control loops such as those for controlling a rotational speed and/or a drive torque of a conveyor roller are of course possible in addition or as an alternative thereto.

Thus, one feature of the suggested measure is that the creation of a physical actual position of an object in the sense of the greatest possible correspondence between the desired target position and the real actual position of the object (position control) is not the focus a priori, but that the greatest possible correspondence between the assumed/determined actual position and the real actual position is aimed for. In other words, the measured position is intended to reflect the real actual position of the object as well as possible, meaning that the measuring error or the measuring inaccuracy is to be as little as possible. Although it is obvious that thereby, a desired target position can also be reached with a high accuracy, it is still a further aspect of the method. Consequently, the invention primarily relates to a measuring method and only secondarily to a control method.

By the suggested measures, the number of the fixedly-installed sensors can be significantly reduced compared to known solutions. In the simplest embodiment, only two fixed sensors are required for the suggested method. Although basically, only one single fixedly-installed sensor (and thus actually fewer than the least amount of sensors necessary for the suggested method) is necessary for synchronizing the position measured with the aid of rotation signals from the drives with the absolute position of a fixedly-installed sensor, in total, the suggested measures do result in an economization on a conveyor system. In fact, in known systems, in case of a systematic error in the position determination by means of the rotation signals from the drives, the position measured by means of the drives has to be synchronized with the absolute position of fixedly-installed sensors over and over again. The size of a real conveyor system requires a plurality of such corrections in order to keep the error in the position determination by means of the drives within acceptable limits. Ideally, however, only two fixedly-installed sensors are required for the suggested method (namely, when a systematic error in the position determination by means of the rotation signals from the drives can be completely eliminated by the suggested measures). However, at least the number of further required corrections of the measured object position can be reduced by fixedly-installed sensors in the course of the conveying device compared to known solutions, as the measuring error between the fixedly-installed sensors remains comparatively small.

In particular, the distance between (further) fixedly-installed sensors on the conveying device can be selected such that a possible (absolute) measuring error in the position determination by means of the rotation signals from the drives over this distance is greater than or equal to an (absolute) measuring error of the fixedly-installed sensors. This ensures that a synchronization of the position measured by means of the drives with the absolute position of a fixedly-installed sensor achieves an improvement of the measurement.

It is particularly advantageous if the objects conveyed on the conveying device comprise deformable bags, which are conveyed directly (that is without loading aids) on the conveyor elements, which are formed as conveyor rollers, and the calculation of a correction position is carried out for said bags. The outer surface of the bag sometimes loops around the conveyor rollers in such an arrangement, wherein the article contained inside the bag does not necessarily carry out this movement along with the bag. This results in a dynamic displacement between the bag and the article transported thereby, which leads to significant systematic deviations between the position calculated by means of the rotation signals from the drives and the real position. With the aid of the suggested measures, the position of such a bag can be determined with greater accuracy.

Moreover, it is particularly advantageous if the presented method is carried out in or before an accumulation area for the objects conveyed on the conveying device. In an accumulation area, there are particular requirements for the positioning accuracy, as the objects are stopped there with little distance from each other or generally close together. With the aid of the suggested measure, it is now possible, for example, to form an object block, in which no or only little accumulation pressure occurs. In any case, accumulation pressure does not occur when successive objects are stopped and/or transported with a mutual distance. However, accumulation pressure may occur if successive objects touch each other when they are stopped and/or transported.

Generally, the object front edge or the object rear edge may equally be used for the presented method. Consequently, the relevant method steps are triggered when the object front edge or the object rear edge reaches and/or passes the detection areas.

Moreover, it is of course also possible to determine the object length of an object and to subject it to the described correction. The object length of an object corresponds to the distance between the object front edge and the object rear edge. Consequently, the corrected object length of an object is the distance between the corrected position of the object front edge and the corrected position of the object rear edge.

The determined object length may also be used for a plausibility check whether the objected detected in a detection area corresponds to an expected object. In this regard, it is assumed that the deviation between the position calculated by means of the rotation signals from the drives and the position of the second detection area does not exceed a specific limit. Consequently, an estimation can take place in the controller, which object is currently moving past the second detection area if an object is detected there. If the object length detected in the first detection area and that detected in the second detection area deviate greatly from each other, or if no object at all is detected although one is expected, a fault on the conveying device can be concluded, for example because multiple objects have become wedged together or objects have fallen off the conveyor system.

In addition, it is noted that the conveying device may have a (main) conveying direction. Positions that follow another position in the conveying direction are located "downstream". Positions that precede another position in the conveying direction are located "upstream". Consequently, the second detection area is located downstream of the first detection area, or in other words, the first detection area is located upstream of the second detection area. An object is conveyed on the conveying device in a conveying direction, from a position located upstream in the direction of a position located downstream. A movement of an object away from a detection area thus means particularly a movement oriented downstream.

Further advantageous designs and further advancements of the invention result from the subclaims as well as from the description in combination with the figures.

It is favorable if steps b) to e) are repeated recursively, wherein, in a further pass of step c), a further detection area of the first sensor or second sensor or of a third sensor fixedly installed on the conveying device takes the place of the second detection area. This way, the achieved accuracy in the position determination can be maintained or even improved if the object passes a further detection area of a fixedly-installed sensor. In this process, the role of the first detection area remains fixed and does not change in the recursive pass of the method steps. This means that in this variant of the method, the position of the object is calculated based on the position of the first detection area. Consequently, a path calculated by means of the rotation signals from the drives to the position of the first detection area is added to the calculation to receive the calculated position. This variant is particularly suitable for conveying devices, whose type does not change at all or only a little in the course of the transport of the objects. Such a conveying device is only constructed from straight conveying sections, for example.

It is further favorable if steps b) to e) are repeated recursively, wherein the second detection area takes the place of the first detection area, and in a further pass of step c), a further detection area of the first sensor or second sensor or of a third sensor fixedly installed on the conveying device takes the place of the second detection area. In this process, the role of the first detection area does not remain fixed but changes with each recursive pass of the method steps. This means that in this variant of the method, the position of the object is calculated based on the position of the detection area last passed by the object. Consequently, a path calculated by means of the rotation signals from the drive, to the position of the detection area last passed by the object is added to the calculation to receive the calculated position. This variant of the method is suitable in particular for conveying devices, whose type does change greatly in the course of the transport of the objects. For example, such a conveying device comprises curved conveying sections, straight conveying sections, junctions, and the like. Of course, a combination with the previously mentioned method variant is possible in this regard.

Moreover, it is favorable if the deviation determined in step d) is applied to the distance between a reference point and the position of the object calculated by means of the rotation signals from the drives, and the correction in step e) is made relative to the path traveled by the object starting from the second detection area. Thus, a relative deviation between the position calculated by means of the rotation signals from the drives and the position of the second detection area is determined. In this regard, the reference point refers in particular to the zero position of an object, starting from which the further positions of the object are calculated. However, the reference point may be selected randomly. In particular, the reference point may be set to the position of a detection area.

If the role of the first detection area remains fixed and does not change in a possible, recursive pass of the method steps, the reference point may, in particular, be set to the position of the first detection area. The deviation between the position calculated by means of the rotation signals from the drives and the position of the second detection area is then applied to the distance from the first detection area.

If, however the role of the first detection area changes with each recursive pass of the method steps and does not remain fixed, the reference point may, in particular, be set to the position of the detection area last passed by the object. The deviation between the position calculated by means of the rotation signals from the drives and the position of the second detection area is then applied to the distance from the detection area last passed by the object.

It is particularly advantageous if, in step d), a correction factor $$k = \frac{\Delta P}{P_{Sig}} = \frac{P_2 - P_{sig}}{P_{Sig}}$$

is calculated, and in step e), the corrected position $$P_{korr} = (1+k) \cdot P_{sig}$$

is calculated and is used as the basis for controlling the (conveying) processes on the conveying device, wherein $P_{sig}$ refers to the position of the object calculated by means of rotation signals from the drives M, measured from the reference point $P_0$, and $P_2$ refers to the position of the second detection area, also measured from the reference point $P_0$. This way, deviations, which occur relative to a path traveled by the object, can be considered. For example, heavy objects may deform an elastic coating of a conveyor roller and thus reduce its effective diameter, which leads to a systematic deviation between the position $P_{sig}$ calculated by means of the rotation signals from the drives and the position $P_2$ of the second detection area. The statements made above regarding the reference point $P_0$ apply here analogously.

It is also particularly advantageous if, in step d), an additive correction value $$d = \Delta P = P_2 - P_{sig}$$

is calculated, and in step e), the corrected position $$P_{korr} = d + P_{sig}$$

is calculated and is used as the basis for controlling the (conveying) processes on the conveying device, wherein $P_{sig}$ refers to the position of the object calculated by means of rotation signals from the drives, measured from the reference point $P_0$, and $P_2$ refers to the position of the second detection area, also measured from the reference point $P_0$. This way, particularly deviations caused by singular events can be considered, for example if slipping or gliding occurs between the conveyor elements and the object upon the acceleration or braking of the object. However, it should be noted that such a slipping is not limited to the correction with an additive correction value d, but can also be linked to a correction factor k, for example if the slipping or gliding does not occur at one point but rather over a particular distance traveled.

Moreover, it is favorable if the object is moved between the first detection area and the second detection area at a constant speed. This way, a deviation, which occurs upon movement of the object at a constant speed, between the position $P_{sig}$ calculated by means of the rotation signals from the drives and the position $P_2$ of the second detection area can be determined in a targeted manner.

Moreover, it is favorable if the object is accelerated and/or decelerated between the first detection area and the second detection area. This way, a deviation occurring upon acceleration and/or braking of the object between the position $P_{sig}$ calculated by means of the rotation signals from the drives and the position $P_2$ of the second detection area can be determined in a targeted manner.

It is also advantageous if the object is moved at a constant speed in some sections and is accelerated and/or decelerated in some sections between the first detection area and the second detection area. This way, both deviations resulting from a movement of the object at a constant speed and deviations occurring upon the acceleration and/or braking of the object between the position $P_{sig}$ calculated by means of the rotation signals from the drives and the position $P_2$ of the second detection area can be determined.

Moreover, it is advantageous if a correction factor k is assigned to a movement of the object at a constant speed, and an additive correction value d is assigned to an acceleration and/or a deceleration of the object. This allows calculating the corrected position $P_{korr}$ in a very differentiated manner. At this point, it should be noted that the assigning of a movement of the object at a constant speed to a correction factor k and the assigning of an acceleration and/or deceleration of the object to an additive correction value d of course does not only apply to the determination of the correction factor k and the additive correction value d but also to the application of the correction factor k and the additive correction value d. In other words, this means in particular that the correction factor k is used for calculating a corrected position $P_{korr}$ if the object is moved at a constant speed, and the additive correction value is used for calculating the corrected position $P_{korr}$ if the object is accelerated or held in place.

Moreover, it is particularly advantageous if, in step e), the corrected position $$P_{korr}=d+(1+k) \cdot P_{sig}$$

is calculated and is used as the basis for controlling the (conveying) processes on the conveying device. This way, deviations between the position $P_{sig}$ calculated by means of the rotation signals from the drives and the position $P_2$ of the second detection area can be considered in a particularly differentiated manner. At this point, it should be noted that different correction factors k and different additive correction values d may also be considered for calculating the corrected position $P_{korr}$. For example, it is possible that upon braking, a different correction factor k and/or a different additive correction value d is determined than upon accelerating. It is also possible that different correction factors k and/or different additive correction values d occur in curved conveying sections of the conveying device than in straight conveying sections. Generally, the corrected position $P_{korr}$ can be calculated in step e) with the aid of the formula $$P_{korr} = \sum_{n=1}^{p} d_n + \left(1 + \sum_{n=1}^{q} k_n\right) \cdot P_{sig}$$

wherein $d_n$ refers to the different additive correction values and $k_n$ to the different correction factors.

Lastly, it is also advantageous if an object block, which comprises multiple objects in close succession, is regarded as a single object for the position determination. This way, the position of an object block can also be calculated correctly, and/or an object block can be positioned more accurately, which is highly advantageous particularly in an accumulation area.

At this point, it should be noted that the variants and advantages disclosed for the presented conveying device can likewise refer to the presented method and vice versa.

For the purpose of better understanding of the invention, it will be elucidated in more detail by means of the figures below.

Figure 2:
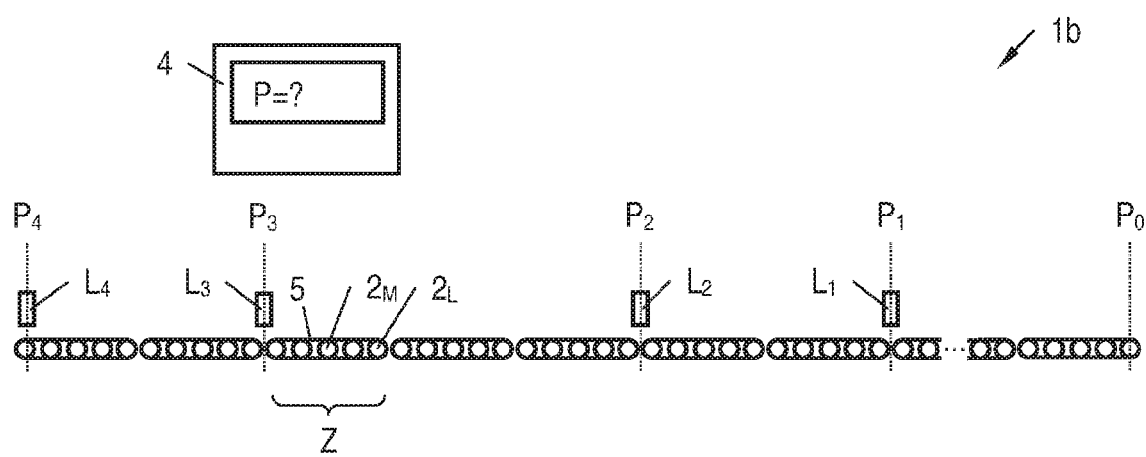
Figure 3:
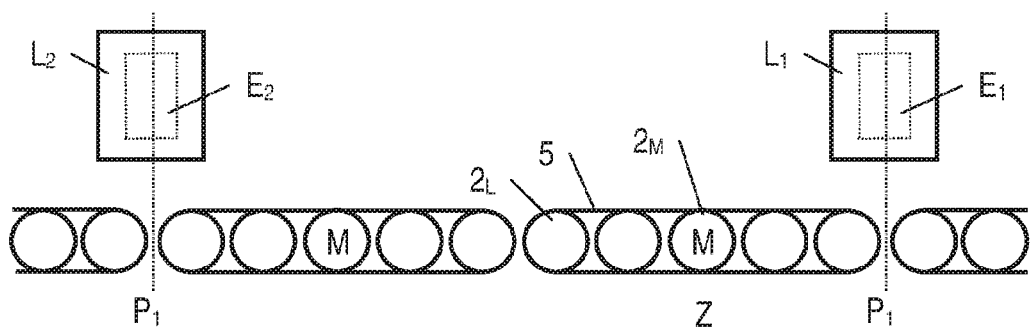
Figure 4:
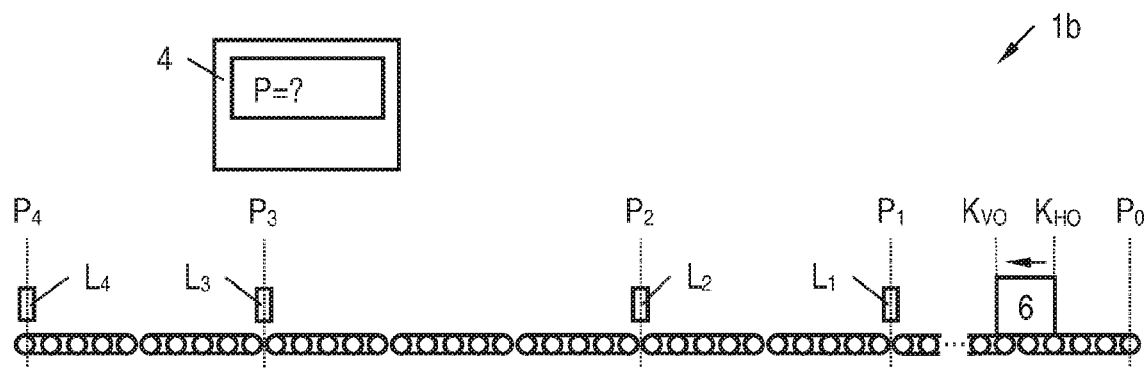
Figure 5:
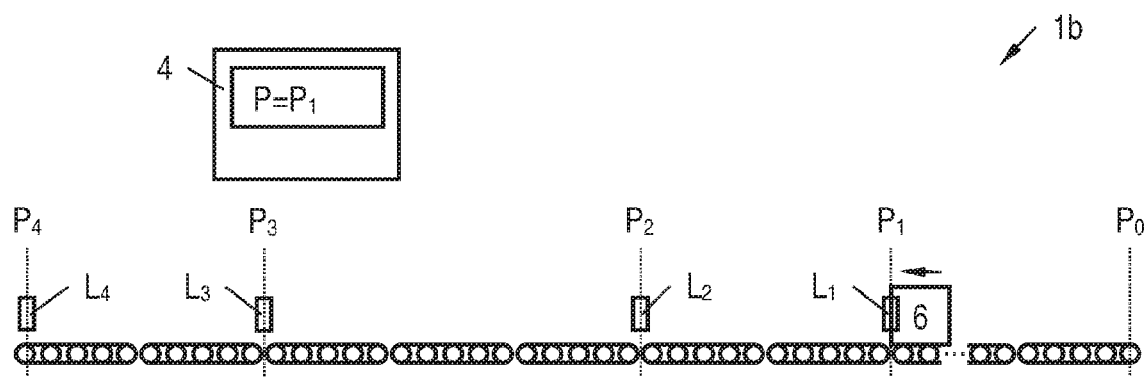
Figure 6:
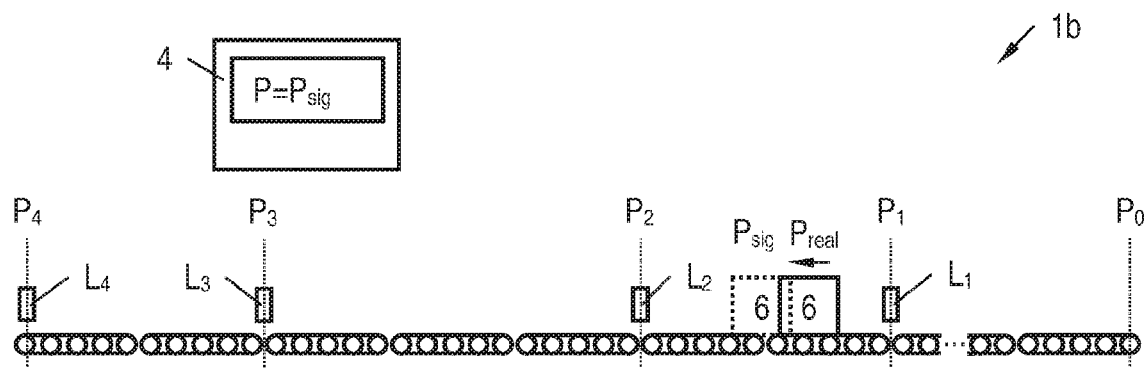
Figure 7:
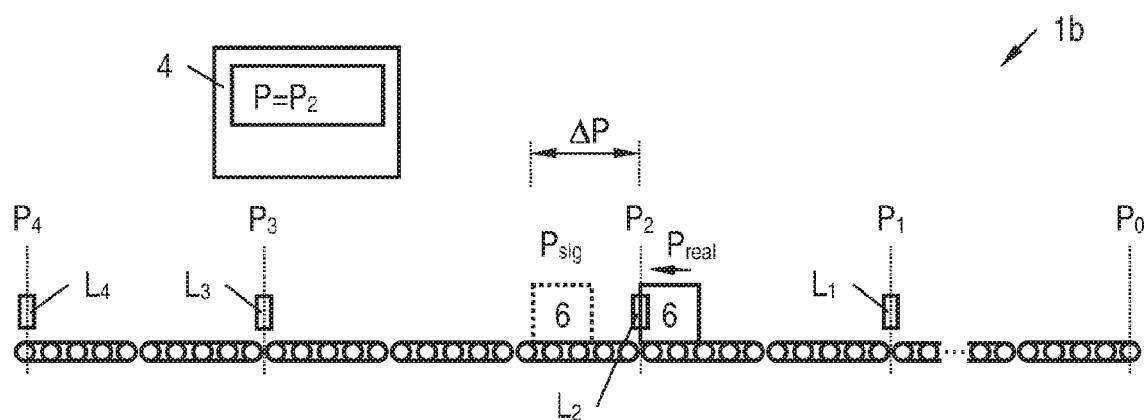
Figure 8:
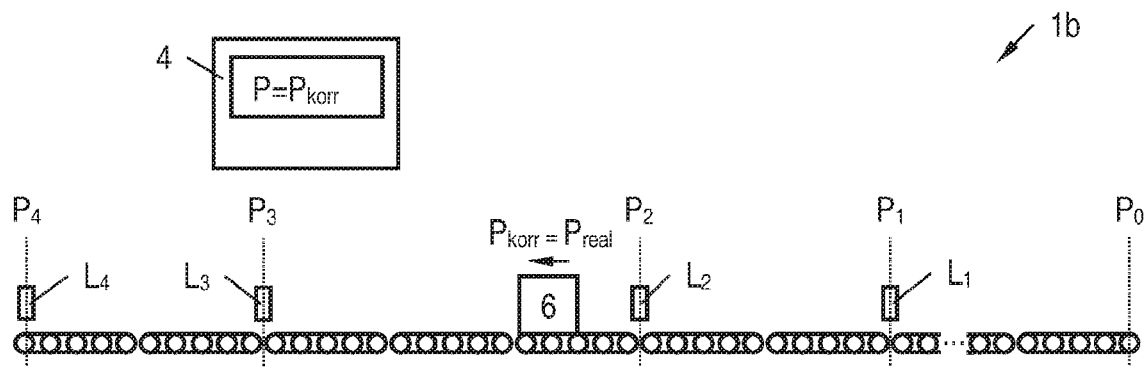
Figure 9:
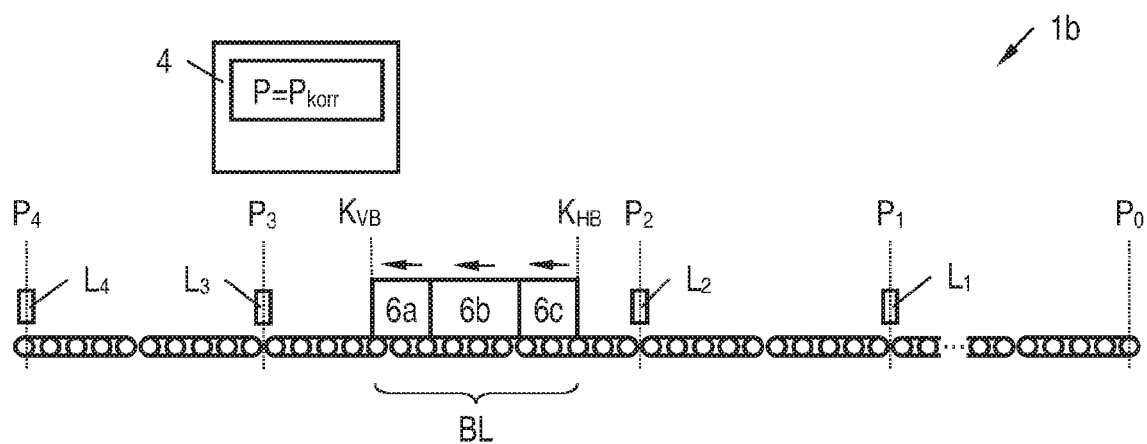
Figure 10:
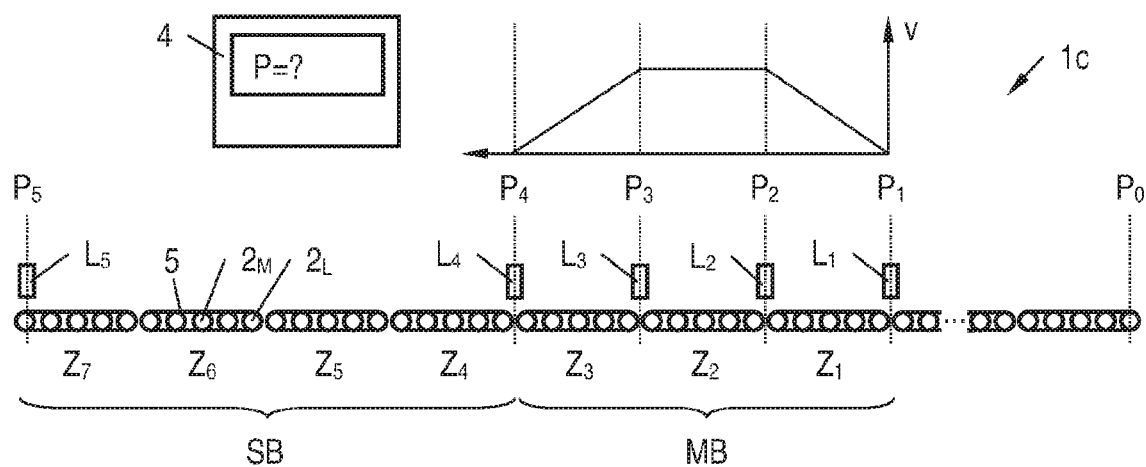
Figure 11:
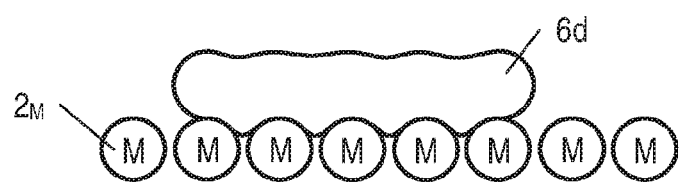
Figure 12:
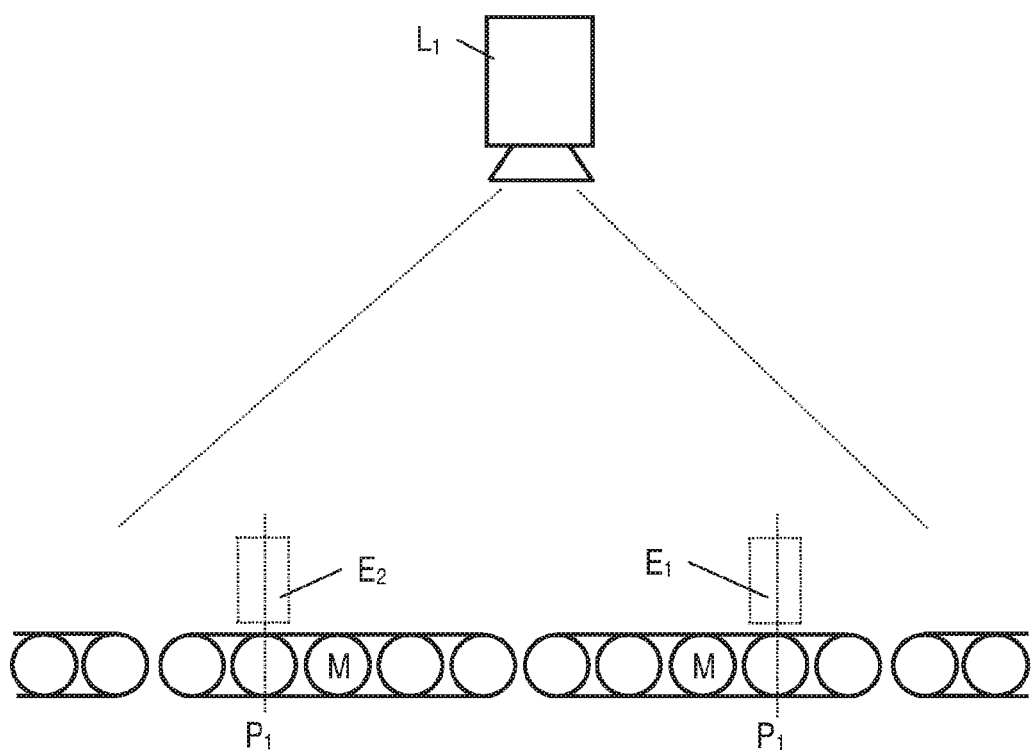

These show in a respectively very simplified schematic representation:

FIG. 1 the general structure of an exemplary conveying device in a top view;

FIG. 2 a further exemplary conveying device in a lateral view;

FIG. 3 a detail view of the conveying device from FIG. 2;

FIG. 4 the conveying device from FIG. 2 in a state in which an object moves toward a first detection area at a first position;

FIG. 5 the conveying device from FIG. 2 in a state in which the object has reached the first detection area;

FIG. 6 the conveying device from FIG. 2 in a state in which the object has passed the first detection area;

FIG. 7 the conveying device from FIG. 2 in a state in which the object has reached a second detection area at a second position;

FIG. 8 the conveying device from FIG. 2 in a state in which the object has passed the second detection area;

FIG. 9 the conveying device from FIG. 2 in a state in which a group of objects move in the form of a block;

FIG. 10 an exemplary conveying device with an accumulation area and a measuring area arranged upstream thereof;

FIG. 11 a bag transported directly on conveyor rollers (in particular a foil bag, such as a "polybag"), and FIG. 12 a detail view of a conveying device with a sensor with multiple detection areas.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIG. 1 shows an exemplary conveying device 1a for transporting objects in a top view. The objects are, for example, cardboard boxes, containers, foil bags and the like. On the conveying device 1a, either the same objects or different objects are conveyed. For example, objects following each other in the conveying direction may be cardboard boxes and foil bags. The conveying device 1a comprises multiple driven conveyor elements 2 for transporting the objects O. In this regard, some of the conveyor elements 2 may be driven or all of the conveyor elements 2 may be driven. In the example shown, the conveyor elements 2 are specifically designed as conveyor rollers arranged between two longitudinal beams 3 (frame profiles).

The conveying device 1a also comprises a first measuring device $L_1$ for detecting an object at a first (measuring) position $P_1$. The measuring device $L_1$ is designed as a light barrier in the concrete example shown, but it may also be formed by a camera, a laser scanner, or the like, for example (also see FIG. 12).

Finally, the conveying device 1a also comprises a controller 4, which in the example shown is arranged on one of the longitudinal beams 3 and is connected in terms of control technology to the conveyor rollers 2 via control lines or a control bus that are not shown.

The conveying device 1a can generally be designed to have any desired length as is adumbrated with the dots in the right region of FIG. 1. Moreover, the conveying device 1a has a (main) conveying direction from right to left, as is adumbrated by two arrows. Positions that follow another position in the conveying direction are located "downstream". Positions that precede another position in the conveying direction are located "upstream".

FIG. 2 shows a second exemplary conveying device 1b in a lateral view. In this example, the conveying device 1b has multiple zones Z, each one of which comprises a motorized conveyor roller $2_M$ and multiple (presently four) non-motorized conveyor rollers $2_L$, which are driven by the motorized conveyor roller $2_M$ via a belt 5. The zones Z may thus be driven independently. This means that the conveying speed in the zone Z may be set independently of the conveying speed in other zones Z, and so on. However, the conveying speed is the same within one zone Z.

At this point, it should be noted that the grouping of a motorized conveyor roller $2_M$ with four non-motorized conveyor rollers $2_L$ is purely exemplary and the conveyor rollers $2_M$, $2_L$ can also be grouped in other ways. For example, it would be conceivable for two motorized conveyor rollers $2_M$ to be combined with five non-motorized conveyor rollers $2_L$ to form a group and thus a correspondingly larger zone Z. It would also be conceivable for all conveyor rollers 2 to be motorized and for grouping via (transmission) belts 5 to be omitted (also see FIG. 11). Each conveyor roller 2 can then form a zone Z. It is of course also conceivable that a zone Z comprises a conveyor belt for transporting objects, which is guided over the conveyor rollers 2. Thus, the conveyor belt forms the transport surface in the zone Z. However, according to the previously described embodiments, the conveyor rollers 2 for a transport surface in the zone Z but not the (transmission) belts 5. Instead of a conveyor belt, the zone Z may also comprise a conveyor chain for transporting the objects.

The conveying device 1b further comprises four sensors $L_1 \ldots L_4$, which are designed as light barriers in the concrete example and are arranged at four different positions $P_1 \ldots P_4$. In this regard, a position $P_2$ of the second light barrier $L_2$ is located downstream of the position $P_1$ of the first light barrier $L_1$, a position $P_3$ of a third light barrier $L_3$ is located downstream of the position $P_2$ of the second light barrier $L_2$, and a position $P_4$ of a fourth light barrier $L_4$ is located downstream of the position $P_3$ of the third light barrier $L_3$. Upstream of position $P_1$ of the first light barrier $L_1$, FIG. 2 also shows a reference point $P_0$, which is not assigned to any sensor in this example.

In FIG. 2, the controller 4 is drawn above the actual conveyor track in order to better depict the processes occurring therein. Among other things, the controller 4 contains a memory space (a variable) for the object position P. Since in the state shown in FIG. 2, no object is on the conveying device 1b yet, the variable is free and/or undefined. It would also be conceivable that the variable is only created once a corresponding object enters the operating range of the conveying device 1b, meaning that the variable for the object position P does not yet exist in the state depicted in FIG. 2.

FIG. 3 shows a cutout of the conveying device 1b with the first light barrier $L_1$ and the second light barrier $L_2$ in an enlarged view. It is easily apparent that the first detection area $E_1$ has a predefined extension around the first position $P_1$, and the second detection area $E_2$ has a predefined extension around the second position $P_2$. The positions $P_1$ and $P_2$ are located in the center of the detection areas $E_1$ and $E_2$, respectively. However, this is not an obligatory condition, but the (detection) positions $P_1$ and $P_2$ could also be arranged off-center in the detection areas $E_1$ and $E_2$. The location of the positions $P_1$ and $P_2$ of the light barriers $L_1$ and $L_2$ between two zones Z is also merely exemplary, and the positions $P_1$ and $P_2$ of the light barriers $L_1$ and $L_2$ could also be located inside a zone Z (also see FIG. 12). Moreover, FIG. 3 shows that one detection area $E_1$, $E_2$ each is assigned to one light barrier $L_1$, $L_2$ each. This also is not an obligatory condition, but it would also be possible for multiple detection areas $E_1$, $E_2$ to be assigned to a sensor $L_1$ (see FIG. 12). Lastly, FIG. 3 shows the structure of a zone Z in detail. There, in particular, the drive (motor) M of the motorized conveyor roller $2_M$ is shown.

FIG. 4 shows the conveying device 1b in a state in which an object 6 is transported in the direction of the first light barrier $L_1$. A movement of the object 6 is symbolized by an arrow drawn above the object 6. The object 6 has an object front edge $K_{VO}$ as well as an object rear edge $K_{HO}$, which is arranged upstream of the object front edge $K_{VO}$. It is assumed that the controller 4 does not yet know the position of the object 6 at the given point in time (e.g. it may apply at a goods-in point before the first detection of an object 6).

At a point in time shown in FIG. 5, the object 6 has reached the first light barrier $L_1$ with its object front edge $K_{VO}$. At this point in time, the position $P_1$ of the first light barrier $L_1$ is taken over in the controller 4 as the position P of the object 6.

At this point, it should be noted that the position $P_1$, $P_2$ of a detection area $E_1$, $E_2$ corresponds to the position $P_1$, $P_2$ of a light barrier $L_1$, $L_2$ in the example shown. In the examples shown in FIGS. 4 to 10, the position $P_1$, $P_2$ of a light barrier $L_1$, $L_2$ can thus be used as a synonym for the position $P_1$, $P_2$ of a detection area $E_1$, $E_2$.

During a conveying movement of the object 6 away from the light barrier $L_1$ in the (main) conveying direction, the position $P_{sig}$ of the object 6 is determined with the aid of rotation signals of the drives M of the conveyor rollers $2_M$. For this purpose, for example, the signals from a rotary encoder coupled to the conveyor roller 2, $2_M$, $2_L$ or the signals from a Hall sensor of the drive motor M of the conveyor roller $2_M$ are analyzed. Using these signals, the position of the conveyor roller 2, $2_M$, $2_L$, the rotational speed of the conveyor roller 2, $2_M$, $2_L$ and the number of rotations of the conveyor roller 2, $2_M$, $2_L$ that it has completed since a certain point in time can be determined. The number of rotations of the conveyor roller 2, $2_M$, $2_L$ multiplied by the circumference of the conveyor roller 2, $2_M$, $2_L$ equals the (theoretical) position of the object 6 calculated from the first position $P_1$. As can be seen from FIG. 6, the position $P_{sig}$ (shown in dashed lines) calculated by means of the rotation signals does not correspond exactly to the actual position $P_{real}$ (shown in solid lines) of the object 6 on the conveying device 1b.

At a point in time shown in FIG. 7, the object 6 has reached the second light barrier $L_2$ with its object front edge $K_{VO}$. At this point in time, the position $P_2$ of the second light barrier $L_2$ is taken over in the controller 4 as the position P of the object 6. Furthermore, a deviation ΔP between the position $P_{sig}$ calculated by means of the rotation signals from the drives M and the position $P_2$ of the second light barrier $L_2$ is determined and subsequently used for calculation a corrected position $P_{korr}$ of the object 6 with the aid of the rotation signals from the drives M.

FIG. 8 shows a corresponding state in which the object 6 moves away from the second light barrier $L_2$. At this point in time, the corrected position $P_{korr}$ present in the controller 4 largely corresponds to the real position $P_{real}$ of the object 6.

In summary, the following steps are carried out in the method for the position determination of the object 6:

a) setting a positional value P, which is assigned to the object 6 in a controller 4 of the conveying device 1b, to the position $P_1$ of a first detection area $E_1$ of a first sensor $L_1$ fixedly installed on the conveying device 1b, when the object 6 is detected in the first detection area $E_1$ (see FIG. 5), b) calculating a position $P_{sig}$ of the object 6 with the aid of rotation signals from drives M for the conveyor elements 2, $2_M$, $2_L$ of the conveying device 1b, starting from the position $P_1$ of the first detection area $E_1$ during a (conveying) movement of the object 6 away from the first detection area $E_1$ in the (main) conveying direction (see FIG. 6), c) setting the positional value P, which is assigned to the object 6 in the controller 4 of the conveying device 1b, to the position $P_2$ of a second detection area $E_2$ of a second sensor $L_2$ fixedly installed on the conveying device 1b, when the object 6 is detected in the second detection area $E_2$ (see FIG. 7), d) determining a deviation ΔP between the position $P_{sig}$ calculated by means of the rotation signals from the drives M and the position $P_2$ of the second detection area $E_2$ after the object 6 has been detected in the second detection area $E_2$ (see FIG. 7), and e) using the determined deviation $\Delta P$ for calculating a corrected position $P_{korr}$ of the object 6 with the aid of the rotation signals from the drives M during a (conveying) movement of the object 6 away from the second detection area $E_2$ in a (main) conveying direction (see FIG. 8).

The calculation of the corrected position $P_{korr}$ of the object 6 can be performed in particular because in step d), a correction factor $$k = \frac{\Delta P}{P_{Sig}} = \frac{P_2 - P_{Sig}}{P_{Sig}}$$

is calculated, and in step e), the corrected position $$P_{korr} = (1-k) \cdot P_{sig}$$

is calculated and is used as the basis for controlling the processes on the conveying device 1b, wherein $P_{sig}$ refers to the position of the object 6 calculated by means of rotation signals from the drives M, measured from the reference point $P_0$, and $P_2$ refers to the position of the second detection area $E_2$, also measured from the reference point $P_0$.

In this case, the deviation $\Delta P$ determined in step d) is therefore applied to the distance between the reference point $P_0$ and the position $P_{sig}$ of the object 6 calculated by means of the drives M, and the correction in step e) is made relative to the path traveled by the object 6, starting from the second detection area $E_2$.

Alternatively, the calculation of the corrected position $P_{korr}$ of the object 6 can also be performed in particular because in step d), an additive correction value $$d = \Delta P = P_2 - P_{sig}$$

is calculated, and in step e), the corrected position $$P_{korr} = d + P_{sig}$$

is calculated and is used as the basis for controlling the processes on the conveying device 1b, wherein $P_{sig}$ again refers to the position of the object 6 calculated by means of rotation signals from the drives M, measured from the reference point $P_0$, and $P_2$ refers to the position of the second detection area $E_2$, also measured from the reference point $P_0$.

A combination of both possibilities is also conceivable, wherein, in step e), the corrected position $$P_{korr} = d + (1+k) \cdot P_{sig}$$

is calculated and is used as the basis for controlling the processes on the conveying device 1b.

In this regard, it is particularly advantageous if a correction factor k is assigned to a movement of the object 6 at a constant speed, and an additive correction value d is assigned to an acceleration and/or a deceleration of the object 6. Experience has shown that the corrected position $P_{korr}$ then corresponds particularly well to the real position $P_{real}$.

The reference point $P_0$ mentioned above can generally be located anywhere on the conveying device 1b and refers to the zero position for the position determination. At the reference point $P_0$, the object 6 thus has the position $P=0$. At the reference point $P_0$, a detection area may be arranged but that is not an obligatory condition. The reference point $P_0$ may also correspond to one of the positions $P_1 \ldots P_4$ of the light barriers $L_1 \ldots L_4$ and/or the detection areas $E_1, E_2$.

The method explained using FIGS. 4 to 8 may proceed recursively. In this process, upon further movement, the position P of the object 6 is corrected in the manner already described at the third light barrier $L_3$ and/or at the fourth light barrier $L_4$.

Specifically, steps b) to e) are repeated recursively, wherein the second detection area $E_2$ takes the place of the first detection area $E_1$, and upon a further pass of step c), a further detection area of the third sensor $L_3$ fixedly installed on the conveying device 1b takes the place of the second detection area $E_2$, and so on. However, it would also be conceivable that the role of the first detection area $E_1$ is maintained in the course of the method, and only a further detection area of the third sensor $L_3$ fixedly installed on the conveying device 1b takes the place of the second detection area $E_2$ upon a further pass of step c). In this case, a deviation $\Delta P$ between the position $P_{sig}$ calculated by means of the rotation signals from the drives M and the second position $P_2$ is always applied to the distance measured from the first detection area $E_1$. The calculation of a corrected position $P_{korr}$ of the object 6 with the aid of the rotation signals from the drives M is particularly accurate in this case. This variant is particularly suitable for conveying devices 1b whose type does not change at all or only a little in the course of the transport of the objects 6. Such a conveying device 1b is only constructed from straight conveying sections, for example. The first variant, in contrast, is suitable in particular for conveying devices 1b, whose type does change greatly in the course of the transport of the objects 6. For example, such a conveying device 1b comprises curved conveying sections, straight conveying sections, junctions, and the like.

FIG. 9 shows an example in which an object block BL, which comprises multiple objects 6a . . . 6c in close succession, is transported over the conveying device 1b. For the position determination, this object block BL is regarded as a single object 6. Apart from this, the method described above is carried out in the manner already described.

At this point, it should also be noted that the presented method can be carried out without an explicit specification of a target position for the object 6, 6a . . . 6c. In this case, the controller 4 has a purely observing role. Of course, the corrected position $P_{korr}$ may also be used in the context of a position control, meaning also if a target position for the object 6, 6a . . . 6c is specified by the controller 4. This aspect is of particular significance in an accumulation area SB, meaning an area in which particularly many objects 6, 6a . . . 6c are stopped with particularly little distance from each other or generally very close together. Consequently, it is advantageous if the described method is carried out in or before an accumulation area SB for the objects 6, 6a . . . 6c conveyed on the conveying device 1b.

In the case of a position control for the objects 6, 6a . . . 6c, the conveyor elements 2, $2_M$, $2_L$ and/or their drives M form the adjustment members of the control loop, and the controller 4 assumes or comprises the function of the (position) control (closed loop control). Other control loops such as those for controlling a rotational speed and/or a drive torque of a conveyor roller 2, $2_M$, $2_L$ are of course possible in addition or as an alternative thereto.

FIG. 10 shows an example, in which a conveying device 1c has an accumulation area SB and a measuring area MB arranged upstream thereof. In this example, the measuring area MB comprises the zones $Z_1 \ldots Z_3$ while the accumulation area SB comprises the zones $Z_4 \ldots Z_7$. Moreover, four light barriers $L_1 \ldots L_4$ are arranged in the measuring area MB, a further, fifth light barrier $L_5$ is arranged in the accumulation area.

In order to make a particularly accurate calculation of a corrected position $P_{korr}$ of an object 6, 6a ... 6c possible, the object 6, 6a ... 6c is moved through the measuring area MB with a particular speed profile. Specifically, the object 6, 6a ... 6c is accelerated constantly in the first zone $Z_1$, whereby the speed v of the object 6, 6a ... 6c increases in a linear manner, it is moved at a constant speed v in the second zone $Z_2$, and lastly, it is decelerated constantly in the third zone $Z_3$, whereby the speed v of the object 6, 6a ... 6c decreases in a linear manner Thus, a correction factor k and an additive correction value d can be determined in a particularly differentiated and accurate manner Thus, the objects 6, 6a ... 6c can be positioned with a particularly high accuracy in the subsequent accumulation area SB. For example, an object 6, 6a ... 6c may be stopped with its object front edge $K_{VO}$ exactly at a front edge of a zone $Z_1 \ldots Z_4$ or with its object rear edge $K_{HO}$ exactly at a rear edge of a zone $Z_1 \ldots Z_4$, whereby the formation of an object block BL, in which no or only little accumulation pressure occurs, is possible. This is significant particularly for accumulating sensitive objects 6, 6a ... 6c. Generally, the application of a measuring area MB on a conveying device 1c can be useful even independently of an accumulation area SB, for example at a goods-in point of a storage and order-picking system.

In this context, it should also be noted that although in the preceding examples, the object front edge $K_{VO}$ was always used for the presented method, the object rear edge $K_{HO}$ may also be used therefor completely equivalently. Consequently, the relevant method steps are triggered when the object rear edge $K_{HO}$ of the object 6, 6a ... 6c reaches and/or passes the detection areas $E_1$, $E_2$.

Moreover, it is of course also possible to determine the object length of an object 6 and to subject it to the described correction. The object length of an object 6, 6a ... 6c is the distance between the object front edge $K_{VO}$ and the object rear edge $K_{HO}$. Consequently, the corrected object length of an object 6, 6a ... 6c is the distance between the corrected position $P_{korr}$ of the object front edge $K_{VO}$ and the corrected position $P_{korr}$ of the object rear edge $K_{HO}$.

Additionally, it should be noted that the assigning of a movement of the object 6, 6a ... 6c at a constant speed v to a correction factor k and the assigning of an acceleration and/or deceleration of the object 6, 6a ... 6c to an additive correction value d of course does not only apply to the determination of the correction factor k and the additive correction value d but also to the application of the correction factor k and the additive correction value d. In other words, this means in particular that the correction factor k is used for calculating a corrected position $P_{korr}$ if the object 6, 6a ... 6c is moved at a constant speed v, and the additive correction value d is used for calculating the corrected position $P_{korr}$ if the object 6, 6a ... 6c is accelerated or held in place.

At this point, it should also be noted that different correction factors k and different additive correction values d may also be used for calculating a corrected position $P_{korr}$. For example, it is possible that for braking, a different correction factor k and/or a different additive correction value d is determined than upon accelerating. It is also possible that different correction factors k and/or different additive correction values d occur in curved conveying sections of the conveying device 1a ... 1c than in straight conveying sections. Generally, the corrected position $P_{korr}$ can be calculated in step e) with the aid of the formula $$P_{korr} = \sum_{n=1}^{p} d_n + \left(1 + \sum_{n=1}^{q} k_n\right) \cdot P_{sig}$$

wherein $d_n$ refers to the different additive correction values and $k_n$ to the different correction factors.

It should further be noted that a separation of the measuring area MB and/or the accumulation area SB into multiple zones $Z_1 \ldots Z_7$ is possible but not obligatory. It is conceivable that the measuring area MB, in particular, has only one zone Z. The movement of the object 6 with the speed profile shown by way of example, however, would be possible anyway. It would further be conceivable that the measuring area MB and/or the accumulation area SB has more or fewer zones $Z_1 \ldots Z_7$ than shown.

In a further advantageous variant, an optional alignment area is arranged before the measuring area MB, in order to be able to transfer the objects 6 to the measuring area MB in a defined alignment. For example, the alignment area has inclined alignment rollers, which ensure that the object 6 reaches the subsequent measuring area MB in a predefined alignment, namely by aligning a side edge of the object 6 with one of the longitudinal beams 3. However, other methods for aligning the objects 6 are also possible, of course.

Research has shown that the problems described occur in particular when bags are transported without a loading aid directly on the conveyor rollers 2, $2_M$, $2_L$, as is shown by way of example in FIG. 11. FIG. 11 makes clear that even with an exact knowledge of the diameters of the conveyor rollers, a calculation of the path traveled by the object 6d with the aid of the rotation signals from the drives M is barely possible as the outer surface of the bag 6d partially loops around the conveyor rollers $2_M$ and the article contained inside the bag 6d does not necessarily carry out the movement along with the bag 6d. This results in a dynamic displacement between the bag 6d and the article transported thereby, which leads to significant systematic deviations ΔP between the position $P_{sig}$ calculated by means of the rotation signals from the drives M and the real position $P_{real}$. Consequently, it is particularly advantageous if the calculation of a corrected position $P_{korr}$ is performed for these bags 6d.

The measuring devices $L_1 \ldots L_5$ are always designed as light barriers in the examples described above. However, this is not an obligatory condition, and a measuring device $L_1$ could also be formed by a camera, a laser scanner, or the like, for example, as shown by way of example in FIG. 12. FIG. 12 also makes clear that multiple detection areas $E_1$, $E_2$ may be assigned to a measuring device $L_1$. For example, different image regions of the camera or the laser scanner are defined as detection areas $E_1$, $E_2$. From FIG. 12, it can also be seen well that a detection area $E_1$, $E_2$ does not necessarily have to be located between two zones Z but may also be located inside a zone Z. Of course, this also applies when a measuring device $L_1 \ldots L_5$ is designed as a light barrier.

It should finally be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

1a . . . 1c Conveying device
2 Conveyor element (conveyor roller)
$2_M$ Motorized conveyor element (conveyor roller)
$2_L$ Non-motorized conveyor element (conveyor roller)
3 Longitudinal beam
4 Controller
5 Belt/conveyor belt
6, 6a . . . 6d Object
$L_1$ . . . $L_5$ Sensor (light barrier)
M Drive for a conveyor element
BL Object block
$E_1$, $E_2$ Detection area
SB Accumulation area
MB Measuring area
Z, $Z_1$ . . . $Z_7$ Zone
P Object position in the controller
$P_0$ Reference point
$P_1$ . . . $P_5$ Position of the detection area
$P_{sig}$ Object position (calculated by means of rotation signals from drives M)
$P_{sig}$ Corrected object position (calculated by means of rotation signals from drives M)
$P_{real}$ Actual object position
$\Delta P$ Positional deviation
$K_{VO}$ Object front edge
$K_{HO}$ Object rear edge
$K_{VB}$ Block front edge
$K_{HB}$ Block rear edge
v Speed

The invention claimed is:

1. A method for the position determination of an object (6, 6a . . . 6d), which is conveyed on a conveying device (1a . . . 1c) by conveyor elements (2, $2_M$, $2_L$), comprising the steps
   a) setting a positional value (P), which is assigned to the object (6, 6a . . . 6d) in a controller (4) of the conveying device (1a . . . 1c), to the position ($P_1$) of a first detection area ($E_1$) of a first sensor ($L_1$) fixedly installed on the conveying device (1a . . . 1c), when the object (6, 6a . . . 6d) is detected in the first detection area ($E_1$),
   b) calculating a position ($P_{sig}$) of the object (6, 6a . . . 6d) with the aid of rotation signals from drives (M) for the conveyor elements (2, $2_M$, $2_L$) of the conveying device (1a . . . 1c), starting from the position ($P_1$) of the first detection area ($E_1$) during a movement of the object (6, 6a . . . 6d) away from the first detection area ($E_1$), and
   c) setting the positional value (P), which is assigned to the object (6, 6a . . . 6d) in the controller (4) of the conveying device (1a . . . 1c), to the position ($P_2$) of a second detection area ($E_2$) of the first sensor ($L_1$) or of a second sensor ($L_2$) fixedly installed on the conveying device (1a . . . 1c), when the object (6, 6a . . . 6d) is detected in the second detection area ($E_2$), wherein
   d) a deviation ($\Delta P$) between the position ($P_{sig}$) calculated by means of the rotation signals from the drives (M) and the position ($P_2$) of the second detection area ($E_2$) is determined after the object (6, 6a . . . 6d) has been detected in the second detection area ($E_2$), and
   e) the determined deviation ($\Delta P$) is used for calculating a corrected position ($P_{korr}$) of the object (6, 6a . . . 6d) with the aid of the rotation signals from the drives (M) during a movement of the object (6, 6a . . . 6d) away from the second detection area ($E_2$).

2. The method according to claim 1, wherein steps b) to e) are repeated recursively, wherein, in a further pass of step c), a further detection area of the first sensor ($L_1$) or second sensor ($L_2$) or of a third sensor ($L_3$) fixedly installed on the conveying device (1a . . . 1c) takes the place of the second detection area ($E_2$).

3. The method according to claim 1, wherein steps b) to e) are repeated recursively, wherein the second detection area ($E_2$) takes the place of the first detection area ($E_1$), and in a further pass of step c), a further detection area of the first sensor ($L_1$) or second sensor ($L_2$) or of a third sensor ($L_3$) fixedly installed on the conveying device (1a . . . 1c) takes the place of the second detection area ($E_2$).

4. The method according to claim 1, wherein the deviation ($\Delta P$) determined in step d) is applied to the distance between a reference point ($P_0$) and the position ($P_{sig}$) of the object (6, 6a . . . 6d) calculated by means of the rotation signals from the drives (M), and the correction in step e) is made relative to the path traveled by the object (6, 6a . . . 6d) starting from the second detection area ($E_2$).

5. The method according to claim 4, wherein, in step d), a correction factor $$k = \frac{\Delta P}{P_{Sig}} = \frac{P_2 - P_{sig}}{P_{Sig}}$$

is calculated, and in step e), the corrected position $$P_{korr} = (1-k) \cdot P_{sig}$$

is calculated and is used as the basis for controlling the processes on the conveying device (1a . . . 1c), wherein ($P_{sig}$) refers to the position of the object (6, 6a . . . 6d) calculated by means of rotation signals from the drives (M), measured from the reference point ($P_0$), and ($P_2$) refers to the position of the second detection area ($E_2$), also measured from the reference point ($P_0$).

6. The method according to claim 1, wherein in step d), an additive correction value $$d = \Delta P = P_2 - P_{sig}$$

is calculated, and in step e), the corrected position $$P_{korr} = d + P_{sig}$$

is calculated and is used as the basis for controlling the processes on the conveying device (1a . . . 1c), wherein ($P_{sig}$) refers to the position of the object (6, 6a . . . 6d) calculated by means of rotation signals from the drives (M), measured from the reference point ($P_0$), and ($P_2$) refers to the position of the second detection area ($E_2$), also measured from the reference point ($P_0$).

7. The method according to claim 1, wherein the object (6, 6a . . . 6d) is moved between the first detection area ($E_1$) and the second detection area ($E_2$) at a constant speed (v).

8. The method according to claim 1, wherein the object (6, 6a . . . 6d) is accelerated and/or decelerated between the first detection area ($E_1$) and the second detection area ($E_2$).

9. The method according to claim 1, wherein the object (6, 6a . . . 6d) is moved at a constant speed (v) in some sections and is accelerated and/or decelerated in some sections between the first detection area (E$_1$) and the second detection area (E$_2$).

10. The method according to claim 1, wherein a correction factor k is assigned to a movement of the object (6, 6a ... 6d) at a constant speed (v), and an additive correction value d is assigned to an acceleration and/or a deceleration of the object (6, 6a ... 6d).

11. The method according to claim 5, wherein, in step e), the corrected position $$P_{korr}=d+(1+k)\cdot P_{sig}$$

is calculated and is used as the basis for controlling the processes on the conveying device (1a ... 1c).

12. The method according to claim 1, wherein an object block (BL), which comprises multiple objects (6a ... 6c) in close succession, is regarded as a single object (6, 6d) for the position determination.

13. The method according to claim 1, wherein the objects (6, 6a ... 6d) conveyed on the conveying device (1a ... 1c) comprise deformable bags, which are conveyed directly on conveyor elements (2, 2$_M$, 2$_L$), which are embodied as conveyor rollers, and the calculation of a corrected position (P$_{korr}$) is performed for these bags.

14. The method according to claim 1, wherein it is carried out in or before an accumulation area (SB) for the objects (6, 6a ... 6d) conveyed on the conveying device (1a ... 1c).

15. A conveying device (1a ... 1c) with a controller (4) for the position determination of an object (6, 6a ... 6d) conveyed on the conveying device (1a ... 1c) by means of conveyor elements (2, 2$_M$, 2$_L$), wherein the controller (4) is configured to a) set a positional value (P), which is assigned to the object (6, 6a ... 6d) in the controller (4) of the conveying device (1a ... 1c), to the position (P$_1$) of a first detection area (E$_1$) of a first sensor (L$_1$) fixedly installed on the conveying device (6, 6a ... 6d), when the object (6, 6a ... 6d) is detected in the first detection area (E$_1$),
b) calculate a position (P$_{sig}$) of the object (6, 6a ... 6d) with the aid of rotation signals from drives (M) for the conveyor elements (2, 2$_M$, 2$_L$) of the conveying device (1a ... 1c), starting from the position (P$_1$) of the first detection area (E$_1$) during a movement of the object (6, 6a ... 6d) away from the first detection area (E$_1$), and
c) set the positional value (P), which is assigned to the object (6, 6a ... 6d) in the controller (4) of the conveying device (1a ... 1c), to the position (P$_2$) of a second detection area (E$_2$) of the first sensor (L$_1$) or of a second sensor (L$_2$) fixedly installed on the conveying device (1a ... 1c), when the object (6, 6a ... 6d) is detected in the second detection area (E$_2$), wherein the controller (4) is additionally configured to d) determine a deviation (ΔP) between the position (P$_{sig}$) calculated by means of the rotation signals from the drives (M) and the position (P$_2$) of the second detection area (E$_2$) after the object (6, 6a ... 6d) has been detected in the second detection area (E$_2$), and
e) use the determined deviation (ΔP) for calculating a corrected position (P$_{korr}$) of the object (6, 6a ... 6d) with the aid of the rotation signals from the drives (M) during a movement of the object (6, 6a ... 6d) away from the second detection area (E$_2$).

* * * * *